Dec. 31, 1929. J. B. KENNEDY 1,741,158
AUTOMATIC FASTENER
Filed Aug. 14, 1925
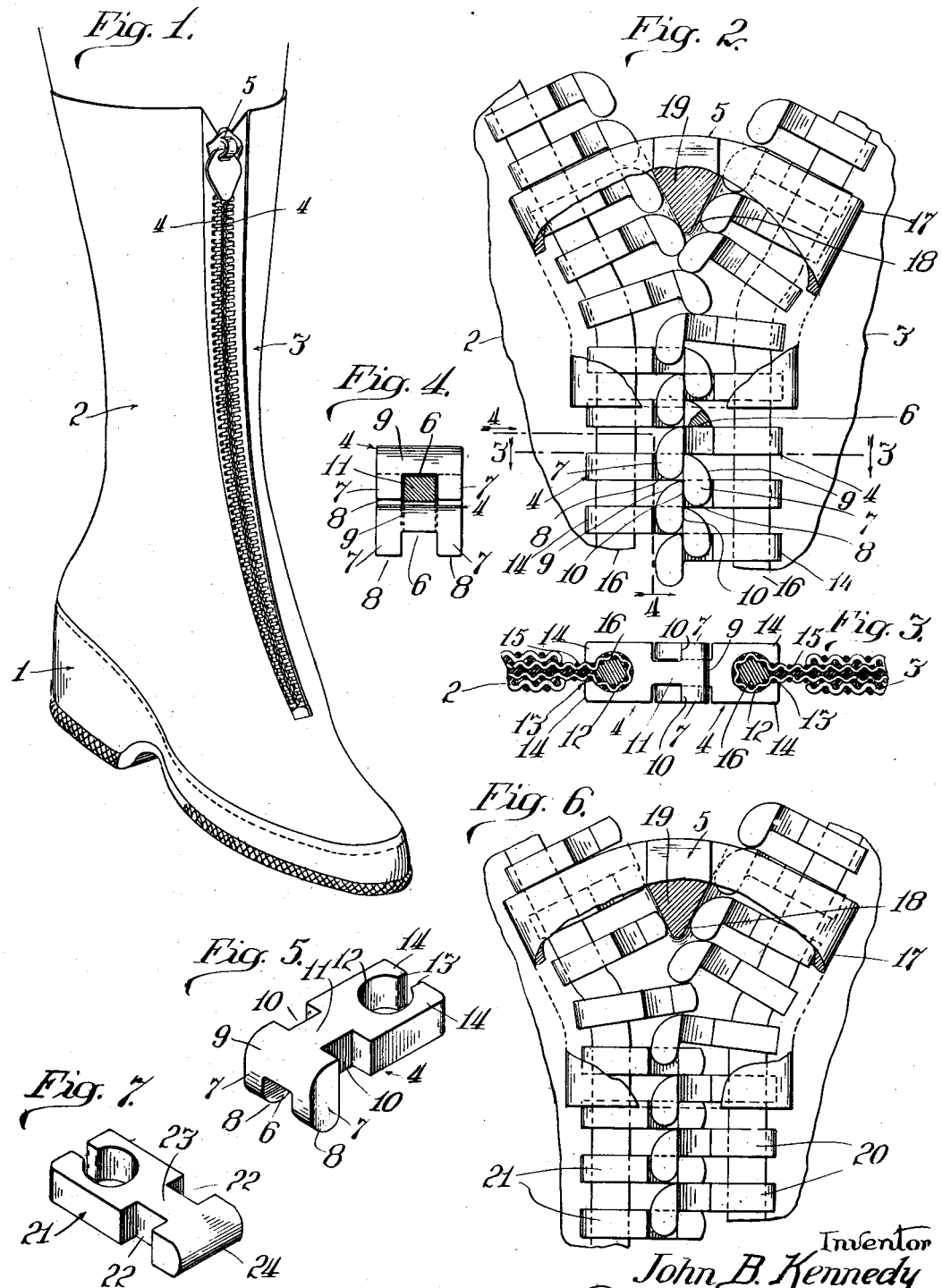

Patented Dec. 31, 1929

1,741,158

UNITED STATES PATENT OFFICE

JOHN B. KENNEDY, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

AUTOMATIC FASTENER

Application filed August 14, 1925. Serial No. 50,183.

My invention has reference more particularly to a fastener of the type wherein a series of fastener elements are arranged on each of the parts which are to be connected and are adapted to be interlocked and released by movement of a cam member or slider along the two series of elements.

The principal objects of my invention are to provide an improved fastening device of the type above referred to; to positively interlock the fastener elements of the one series with the fastener elements of the other series; to insure ample flexibility in cases where flexibility is required, as for example, when the fastener is used in connection with a shoe; to simplify the construction of the fastener elements; and in general to afford a reliable and effective fastener of the slider or cam operated type which is simple and capable of being readily and economically manufactured.

On the drawings, Fig. 1 is a perspective view of an overshoe showing my improved fastener thereon.

Fig. 2, an enlarged fragmentary view of the fastener and the slider or cam operating member with portions broken away to disclose details of the construction.

Fig. 3, a view taken substantially on the line 3—3 of Fig. 2.

Fig. 4, a fragmentary sectional view on the line 4—4 of Fig. 2.

Fig. 5, an enlarged perspective view of the fastener elements used in the structure of Figs. 2 and 3.

Fig. 6, a view similar to Fig. 2 showing a modification of my fastener; and

Fig. 7, an enlarged perspective view showing the modified form of fastener element used in the construction of Fig. 5.

Referring to the drawings, I have shown my improved fastener in connection with an overshoe of the type commonly worn by women although it is to be understood that my fastener is intended to and may be used in connection with other types of shoes or with any other articles wherein a quick operating fastener is desired, the overshoe in the present case being indicated as a whole at 1 and divided down the front to form separable side portions 2 and 3 each of which has a series of fastener elements 4 arranged along the edge thereof and adapted to be interlocked with and released from the other series of fastener elements by movement of the cam member or slider 5 along the two series of fastener elements.

The fastener elements on both side portions 2 and 3 are alike, and each comprises a flat member having an angular end portion which is notched as at 6 to form a pair of laterally spaced, angular projections 7. The base of the notch 6 is preferably in the plane of the under surface of the member 4, and in practice the ends 8 of the projections 7 are rounded or inclined sufficiently so that they will slide easily over the rounded guiding face 9 at the end of the member 4. Each of the members 4 is also formed with a pair of notches 10 in the lateral edges respectively thereof and adjacent the angular end, said notches being adapted to admit the projections 7 of another corresponding element for interlocking therewith, the lateral notching of the member 4 affording an intermediate neck 11 which is straddled by the projections 7 of the other element 4 and engaged in the end notch of said other element.

Each of the members 4 is formed at the rear end with an aperture 12 having a restricted opening 13 along the side forming substantially a pair of jaws 14 for securing the elements on the parts which are to be connected thereby. The elements 4 may be mounted in any suitable manner, as for example, by clamping the jaws 14 around the enlarged edge of a stringer 15 which may be formed by doubling a length of tape around a cord or other flexible member 16, and the stringer 15 may be secured to the parts which are to be connected. Obviously other means for attaching the elements 4 may be used and the elements may be attached directly to the parts which are to be fastened together, as for example, the side portions 2 and 3 of the overshoe, the manner of attachment shown being merely illustrative and not intended to limit the invention.

The elements 4 are arranged in series on the parts to be connected, and in suitable spaced relation so that the series of elements on one of the parts may be inserted between the series of elements on the other part with the projections 7 of the elements of each series engaged in the notches 10 of the elements of the other series. In view of this construction a double interlocking of the elements is obtained inasmuch as each element not only has its projections 7 engaged with notches 10 of an opposed element 4, but said element also has projections 7 of an opposed element engaged in the side notches 10 thereof so that a very substantial interlocking occurs. Moreover, since each element has a pair of end projections 7 straddling a neck portion 11 of an opposed element and engaged in the side notches 10 of the latter element, any lateral bending of the fastener, while it will tend to withdraw the projections 7 at one side of the elements from the corresponding notches 10, such lateral bending will at the same time result in a more positive engagement of the projections 7 at the opposite side of the elements with the corresponding notches 10, and any possibility of causing the elements 4 to slip out of engagement sidewise is thus entirely avoided.

For interlocking and releasing the elements 4 a slider of the usual type is employed comprising front and rear plates 17 and 18 respectively which are secured together in spaced relation with a wedge shaped member 19 therebetween. The lateral edges of the plates 17 and 18 are inturned so as to form divergent channels at opposite sides of the member 19 merging into a single channel at the apex of the member 19, in which said channels the opposed series of members 4 are brought together and interlocked by movement of the slider in one direction and are released and separated by movement of the slider in the other direction.

The members 4 may be readily constructed from bar stock of the width and thickness of the members 4, by merely cutting the stock into sections of the required length, then forming the notches 6 and 10 and turning down the end of the section so as to form the angular projections 7. The notches may, if desired, be formed after bending the end of the bar section. The rounded faces 9 which are readily formed in bending the ends of the members 4, are quite desirable as they serve to guide the ends of the elements 4 of each series over the ends of the elements of the other series so that the projections 7 interlock with the notches 10.

In the modified form of fastener shown in Fig. 6 the elements 20 on the one side are the same as the elements 4 hereinbefore described. The elements 21 of the opposed series, however, have side notches 22 similar to the side notches 10 of the elements 4, but said members 21 have the end notch 6 and end projections 7 omitted, the end of the member 21 being merely in the form of a cross head, preferably with a rounded outer face 24 which serves to guide the element 21 over the rounded face 9 of an opposed element 4 and under the rounded extremities 8 of the projections 7 of an adjoining opposed element 4. In this modified form there is no double interlocking such as takes place when the series of fastener elements on both of the connected parts comprise the elements 4, as in the modified form the interlocking is occasioned merely by the engagement of the end projections 7 of the elements 20 in the notches 22 of the elements 21.

While I have shown and described my invention in a preferred form, I am aware that various changes and modifications may be made without departing from the principles of my invention the scope of which is to be determined by the appended claims.

I claim:

1. In a fastening device of the class described, the combination of opposed series of fastener elements each of said elements comprising an elongated flat member with a pair of laterally spaced notches in the edges thereof adjacent the outer end and a pair of laterally spaced projections at substantially right angles to said end adapted to engage in the notches of an element of the opposed series, each of said members having the outer end face provided with an inclined surface portion in front of each notch and leading toward the respective notch for guiding the projections of the opposed element thereto, and a slider operable along the two series of elements for interlocking and releasing same.

2. In a fastening device of the class described, the combination of opposed series of fastener elements comprising elongated flat plates arranged face to face in spaced relation and each plate having a notch in each lateral edge adjacent the end and a downturned forked end affording spaced substantially parallel projections for engaging in the edge notches of an element of the opposed series, said plate having the outer end face provided with inclined surface portions directly in front of each notch and extending over the respective projection for guiding in the projections of an opposed element to said notches, and a slider operable along the two series of elements for interlocking and releasing same.

3. In a fastening device of the class described, the combination of opposed series of fastener elements and a slider operable therealong for interlocking and releasing same, each of said elements having mounting means with a flat portion projecting therefrom and provided with a notch in each lateral edge, and a pair of laterally spaced downturned projections at the end of said flat portion and located respectively in longitudinal planes passing through the aforesaid notches.

4. In a fastening device of the class described, the combination of opposed series of fastener elements and a slider operable therealong for interlocking and releasing same, each of said elements having mounting means with a flat portion projecting therefrom and provided with a notch in each lateral edge, and a pair of laterally spaced projections depending from the end of said flat portion and located respectively in longitudinal planes passing through the aforesaid notches and said projections having inclined faces extending thereover for guiding the projections of an opposed element to the notches.

JOHN B. KENNEDY.